Sept. 29, 1964     B. D. GREENSHIELDS     3,151,235
METHOD AND APPARATUS FOR RECORDING ROAD
APPEARANCE, GEOMETRY AND SURFACE
CHARACTERISTICS
Filed June 5, 1961     5 Sheets-Sheet 1
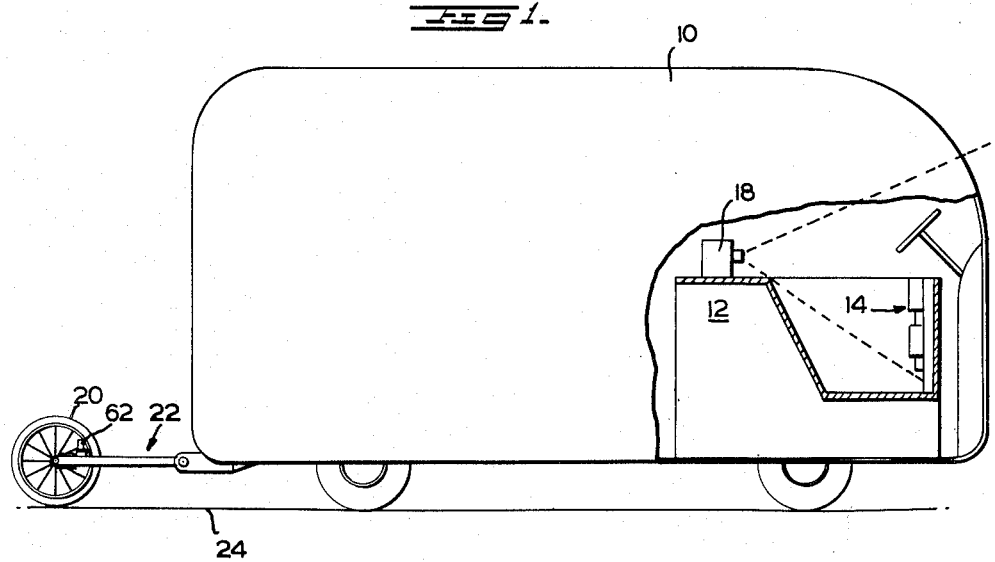
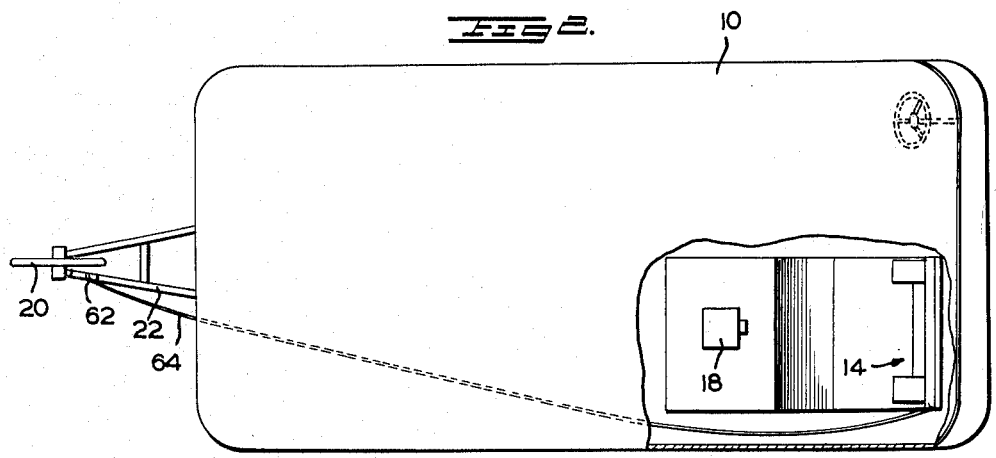
INVENTOR
BRUCE D. GREENSHIELDS
BY *Kenyon, Palmer, Stewart & Estabrook*
ATTORNEYS Sept. 29, 1964
B. D. GREENSHIELDS
3,151,235
METHOD AND APPARATUS FOR RECORDING ROAD
APPEARANCE, GEOMETRY AND SURFACE
CHARACTERISTICS
Filed June 5, 1961
5 Sheets-Sheet 2
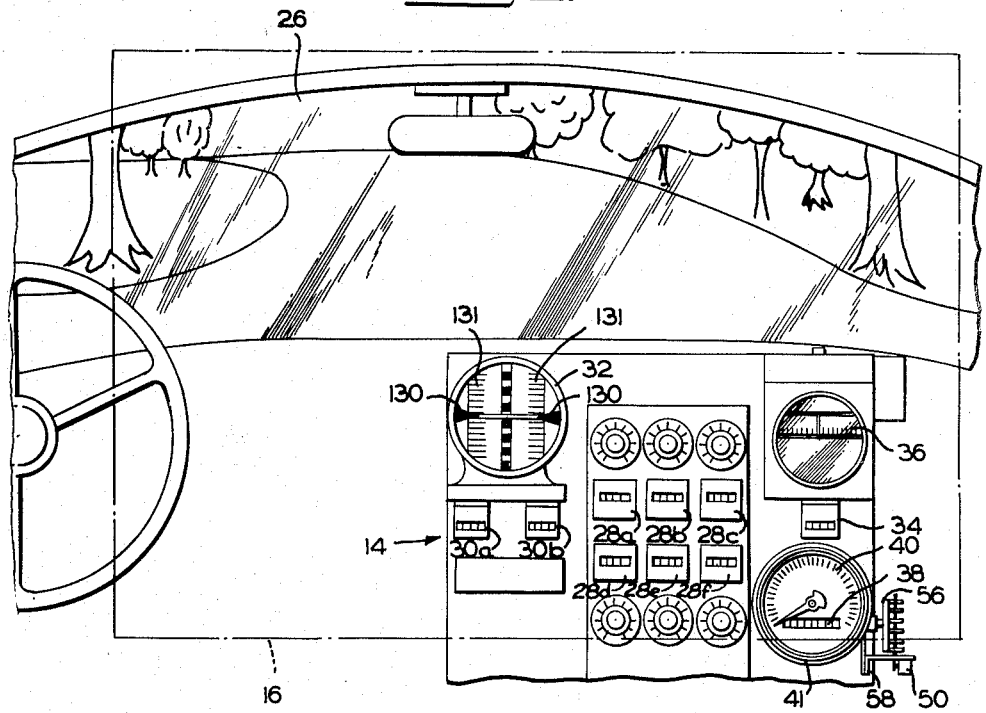
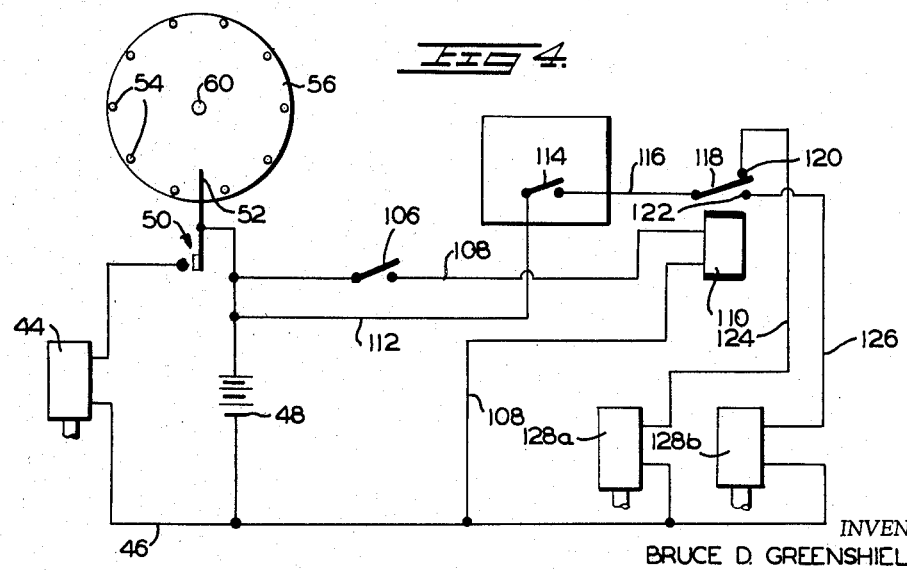
INVENTOR
BRUCE D. GREENSHIELDS
BY *Kenyon, Palmer, Stewart & Estabrook*
ATTORNEYS Sept. 29, 1964  B. D. GREENSHIELDS  3,151,235
METHOD AND APPARATUS FOR RECORDING ROAD
APPEARANCE, GEOMETRY AND SURFACE
CHARACTERISTICS
Filed June 5, 1961  5 Sheets-Sheet 3
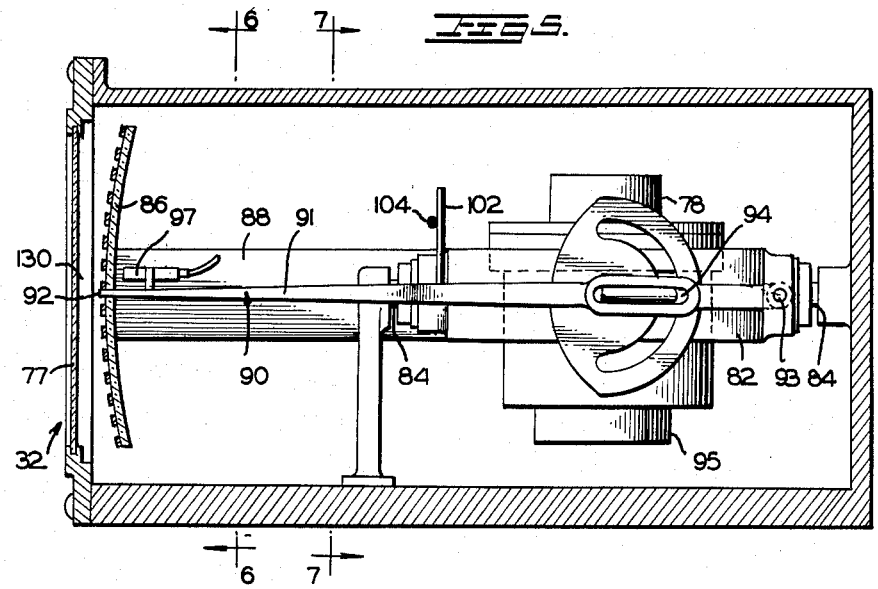
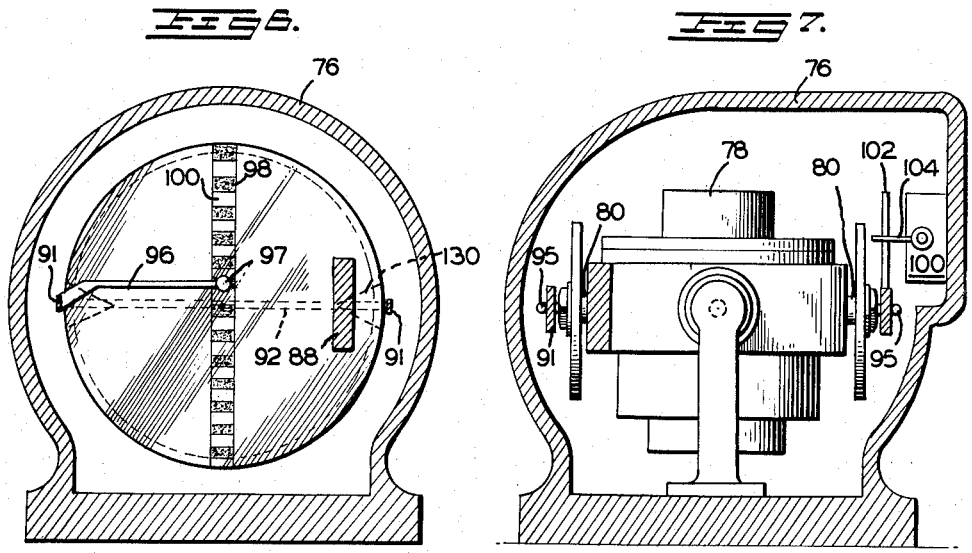
INVENTOR
BRUCE D. GREENSHIELDS
BY *Kenman, Palmer, Stewart & Estabrook*
ATTORNEYS

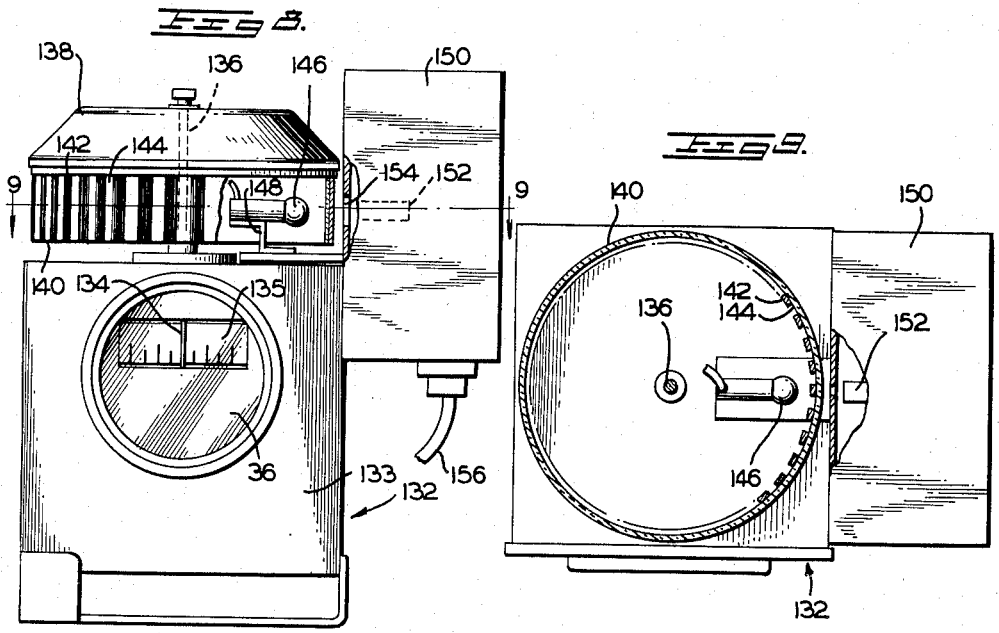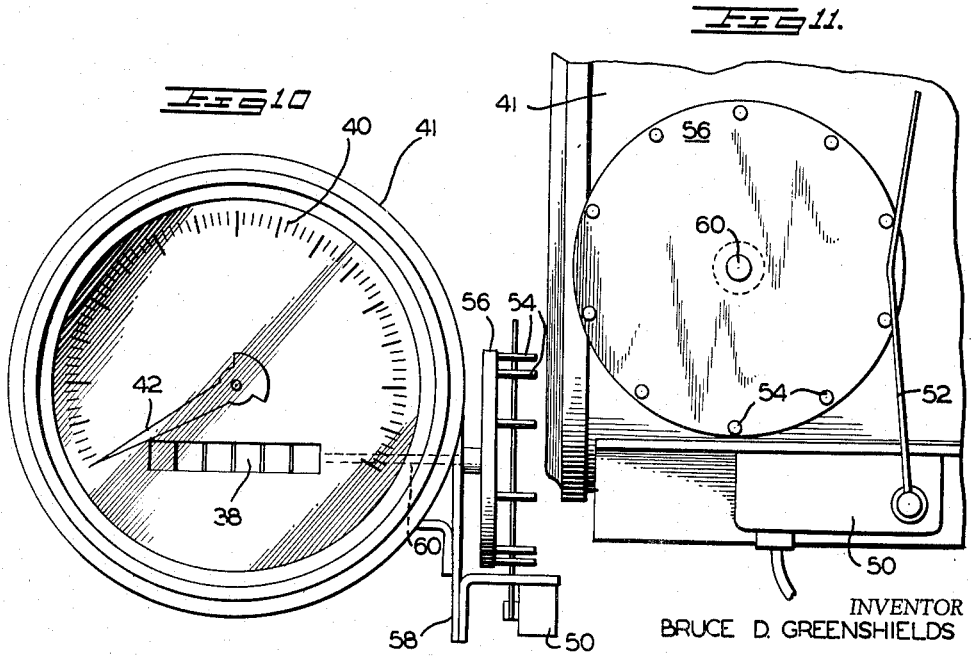

INVENTOR
BRUCE D. GREENSHIELDS

ATTORNEYS

United States Patent Office 3,151,235
Patented Sept. 29, 1964

3,151,235
METHOD AND APPARATUS FOR RECORDING ROAD APPEARANCE, GEOMETRY AND SURFACE CHARACTERISTICS
Bruce D. Greenshields, 1025 Arbordale, Ann Arbor, Mich.
Filed June 5, 1961, Ser. No. 114,830
9 Claims. (Cl. 235—92)

This invention relates to a method and apparatus for recording road appearance, geometry and surface characteristics. More particularly, it concerns a new and improved method and apparatus by which measurements of road roughness or surface irregularity, line, grade, and side slope or crown are recorded while traveling the road together with road appearance, a measurement of distance from the starting point at which the record is made and the speed of travel at the time of recording.

Due to the increasing number of roads and highways being constructed in this country, highway maintenance engineers and/or planners are confronted with an acute problem in obtaining and maintaining up-to-date accurate records for indicating to them the conditions of pre-existing roads in order that they may appraise questions of road efficiency or serviceability to set up maintenance priority programs as well as to determine the need for planning and the construction of new roads. To make these determinations, it is essential that the geometry of the road (i.e. line, grade, and side slope or crown), the surface condition or roughness of the road and the appearance thereof be made available. Heretofore, this information has been obtained through piecemeal records of surveying parties, aerial photography, inspection crews and other sources with the result that much time and effort must be expended to prepare a composite working record on which all of the aforesaid information appears. Perhaps the principal reason for the difficulty in obtaining such a working record has been due to the lack of suitable means by which all of the information required may be quickly and simultaneously recorded in terms directly usable. For example, various devices have been proposed for obtaining readings for road surface characteristics and which record these characteristics as a tracing on a chart arranged to correlate the measurements with the location on the road at which the measurements were taken. Readings of road grade and line, on the other hand, have been available through reports of surveyors or photogrammitrists in terms wholly unrelated to the terms in which the roughness or surface characteristics are recorded. Thus, all of these bits of information must be correlated before the highway maintenance or planning engineer has at his disposal a record from which he can make his final determinations of the questions aforementioned. Also, the time required in assembling this information by methods heretofore available makes it extremely difficult to keep the records current and of maximum utility.

Accordingly, an object of this invention is to provide an improved method and apparatus for recording the geometry, surface condition and appearance of a road or highway by which the aforementioned problems are effectively and substantially overcome.

Another object of this invention is the provision of a new and improved apparatus adapted to be mounted in a vehicle for recording the line, grade and surface characteristics of a road simultaneously with the appearance thereof in terms usuable directly by the highway planning or maintenance engineer.

A further object of this invention is that of providing an apparatus of the type referred to by which measurements of road line, grade and surface characteristics are made continuously during travel of a vehicle over the road and recorded in terms of digital units at predetermined distance intervals along the road, the record indicating also in digital units the distance from the starting point at which the record was made.

A further object of this invention is the provision of an apparatus of the type referred to in which cumulative totals of measurements of road line, grade and surface characteristics are registered and recorded at predetermined intervals along the road to provide a complete, self-contained and derectly usuable record of these characteristics.

Another object of this invention is the provision of a new and unique apparatus for measuring surface irregularities or roughness characteristics of a road by which surface irregularities of various magnitudes are indicated in digital form.

A further object of this invention is that of providing a new and improved apparatus for measuring and recording changes in road grade and line directly in digital form.

Still another object of this invention is the provision of a new and unique method for recording grade line and surface characteristics of a road by which information is made available for direct use by highway planning or maintenance engineer.

Other objects and further scope of applicability of the present invention will become apparent from the detailed description given hereinafter. It should be understood, however, that the detailed description, while indicating preferred embodiments of the invention, is given by way of illustration only, since it will become apparent to those skilled in the art from this description, that various changes and modifications can be made without departing from the true spirit and scope of this invention.

In general, the aforementioned objects are accomplished by measuring, while traveling over a road, speed and distance traveled, changes in line and grade and numbers of surface irregularities within different ranges of magnitude. The measurements of distance traveled, changes in line and grade and numbers of surfaces irregularities are registered as cumulative totals on digital counters, which counters along with the indication of speed and distance traveled are recorded photographically at regular intervals along the road. Apparatus for carrying out the invention is adapted to be mounted in a vehicle and includes a panel on which is displayed a plurality of roughness or surface irregularity registering counters, grade and side slope indicating means including a pair of grade change registering counters, compass means including a direction or line change registering counter, a distance counter or odometer and a speedometer dial. The portion of the panel on which the aforementioned items are displayed is positioned within the optic field of a camera, the optic field also including a view of the road through the windshield of the vehicle in which the apparatus is mounted. The shutter of the camera is arranged to be operated at predetermined intervals along the road by an electric circuit in turn operated by means associated with the odometer so that a photographic recording of the panel and the road appearance as viewed through the vehicle windshield is made at regular intervals along the road.

A more complete understanding of the present invention and its method of use will be had by reference to the accompanying drawings in which:

FIG. 1 is a diagrammatic side elevation of a vehicle partially cut away to show the location of the apparatus of this invention in the vehicle;

FIG. 2 is a plan view of the vehicle shown in FIG. 1;

FIG. 3 is a schematic view showing the optic field of the recording camera of this invention;

FIG. 4 is a circuit diagram of the camera and grade change registering counter actuating system of this invention;

FIG. 5 is an enlarged side elevation in partial cross section showing the artificial horizon means for making measurements of road grade and side slope;

FIG. 6 is a cross section taken along line 6—6 of FIG. 5;

FIG. 7 is a cross-sectional view taken along line 7—7 of FIG. 5;

FIG. 8 is an enlarged front elevation partially cut away showing the compass means by which measurements of road line are made by this invention;

FIG. 9 is a cross-sectional view taken along line 9—9 of FIG. 8;

FIG. 10 is a front elevation of the speedometer and distance counter or odometer used with this invention and cam operated switch means for operating the recording camera;

FIG. 11 is an enlarged, fragmentary side elevation of the device illustrated in FIG. 10 and showing the cam actuated switch for operating the recording camera of this invention;

Figure 12:
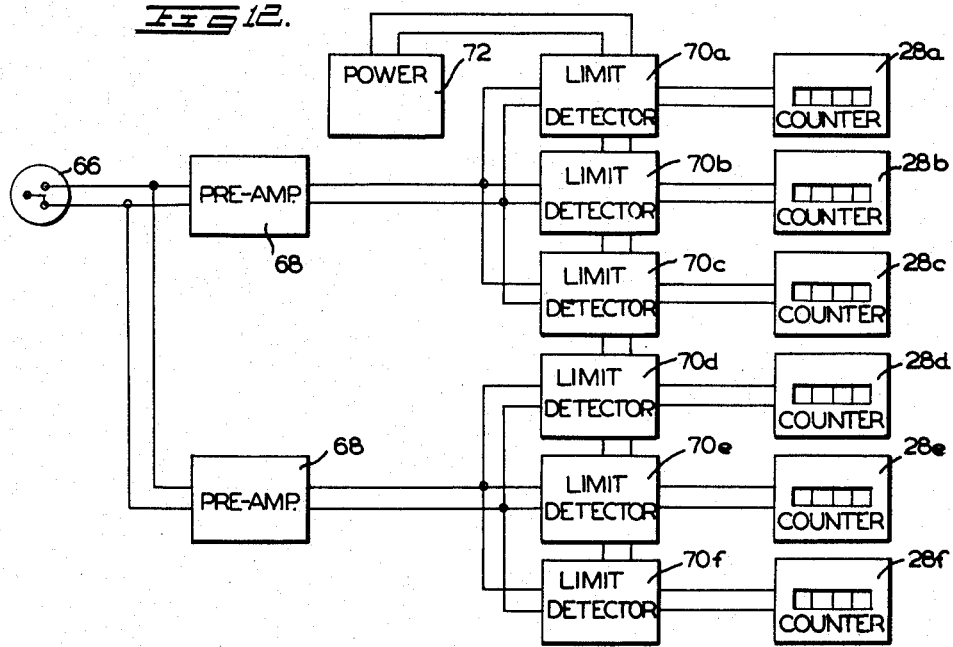
FIG. 12 is a block diagram showing the system of this invention by which surface irregularities are detected and registered.
Figure 13:
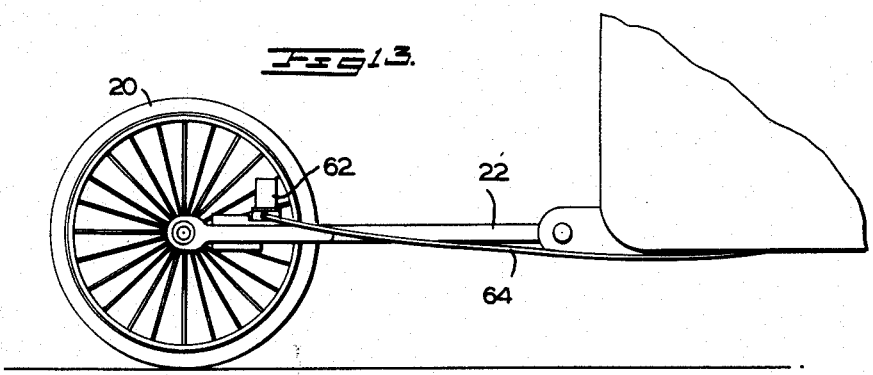
FIG. 13 is an enlarged fragmentary view illustrating the surface irregularity sensing means of this invention.

The apparatus of this invention is adapted to be carried by a vehicle 10 and includes a chassis 12 positioned on the floor of the vehicle near the front end thereof. Situated forwardly of the chassis is a rearwardly facing panel 14, the upper portion of which is within the optic field 16 of a camera 18. Preferably, though not necessarily, a fifth wheel 20 is attached to the rear of the vehicle 10 such as by a pivoted bracket 22, the wheel being in engagement with the road surface 24 for the purpose of sensing surface irregularities as will be more fully described hereinafter.

As illustrated in FIG. 3, the optic field 16 of the camera 18 includes not only the rearwardly exposed face of the panel 14, but also a substantial portion of the vehicle windshield 26, so that a photographic recording produced by the camera shows both the instruments displayed on the rearward face of the panel 14 and the appearance or topography of the road as the vehicle travels thereover. The instruments displayed on the rearward face of the panel 14 include a first set of digital counters 28a, 28b, 28c, 28d, 28e and 28f for registering measurements of surface irregularities in a manner which will be more fully described hereinafter, each of the counters being adapted to be power driven such as by a solenoid or the like (not shown). A second set of digital counters 30a and 30b are displayed on the panel 14 below the indicating face 32 of an artificial horizon device and a third counter 34 is positioned below the indicating dial 36 of a direction indicating device such as a gyroscopic compass, the artificial horizon device and compass being described in detail below. The counters 30 and 34, like the counters 28 are adapted to be driven (such as by a solenoid) in a manner which also will be described more fully hereinafter. A fourth counter 38 is also displayed on the rearward face of the panel 14 and within the optic field 16 of the camera within the indicating dial 40 of a standard speedometer having a needle 42. The counter 38 may be a conventional odometer of the type mechanically or otherwise driven in synchronism with the vehicle wheels to indicate distance traveled by the vehicle and preferably indicates distance to the nearest one hundredth of a mile.

The camera 18 may be of any suitable type such as a conventional movie camera equipped with a solenoid for actuating the shutter thereof at regular intervals of distance traveled by the vehicle 10. The solenoid is not illustrated on the schematic showing of the camera in FIGS. 1 and 2, but is designated by the numeral 44 in the circuit diagram of FIG. 4. To operate the solenoid 44 and thus open the shutter of the camera 18, a circuit 46 is provided including with the solenoid a source of electrical energy 48 and a micro-switch 50 having a trip lever 52. The switch 50 is arranged to be closed at predetermined distance intervals of vehicle travel by the engagement with the trip lever 52 of cam pins 54 extending from a cam wheel 56. As shown in FIGS. 3, 10 and 11, the cam wheel is supported at the side of the speedometer 41 by a bracket 58 and rotatably driven by a shaft 60 extending from the odometer or fourth counter 38. In this manner, the switch 50 will be actuated at regular intervals of vehicle travel to open the shutter of the camera 18 to record the objects within its optic field 16. It is preferred that the interval of camera operation be one 1/100 of a mile or 52.8 feet, though this distance interval can be varied either by changing the number of pins 54 on the cam wheel 56 or by incorporating suitable gearing for driving the shaft 60.

To provide an indication of the surface condition of the road over which the vehicle 10 travels, each of the first set of counters 28 register surface irregularities within a predetermined range of magnitudes so that the number presented by each counter to the recording camera represents the cumulative total of irregularities within each range. In other words, the counter 28a would, for example, register surface irregularities up to 1/4" in height; the counter 28b irregularities of a magnitude up to 1"; the counter 28c irregularities of a magnitude up to 2"; and in like fashion, the counters 28d, 28e and 28f registering irregularities in proportionately larger ranges of magnitude. To operate each of the counters 28 in this manner, an irregularity sensing device such as an accelerometer 62 is mounted on the bracket 22 for movement with the ground engaging wheel 20. While this arrangement is preferred, it will be understood by those familiar in the art that the accelerometer 62 may be, if desired, mounted on an axle of the vehicle 10 for movement with the wheels thereof. The accelerometer 62 is of conventional design and the functions to generate an electric pulse corresponding in magnitude to the impact imposed thereon, or in this instance, to the magnitude of the irregularity encountered by the wheel 20. This pulse is transmitted by way of a cable 64 to an input terminal 66 mounted on the chassis 12 but shown diagrammatically in the block diagram of FIG. 12. The pulses generated by the accelerometer are amplified by pre-amplifiers 68 and fed to a plurality of limit detectors 70a, 70b, 70c, 70d, 70e and 70f connected with a suitable power supply 72 and respectively with each of the counters 28a, 28b, 28c, 28d, 28e and 28f. The limit detectors 70 may be adjusted to pass an actuating pulse to their respective counters only if the pulse transmitted from the amplifiers 68 exceeds a predetermined level. Thus, if a pulse generated by the accelerometer corresponds to a surface irregularity in the range up to one quarter of an inch, for example, only the limit detector 70a will pass a signal to the counter 28a to register the irregularity since the limit to which the detectors 70b, 70c, 70d, 70e and 70f have been adjusted will not have been exceeded. If, however, the irregularity sensed by the accelerometer is of a magnitude within the range up to one inch in height, then the limits of both detectors 70a and 70b will be exceeded and a pulse delivered to actuate counters 28a and 28b will be delivered to register the irregularities within these ranges. Similarly, the remaining counters will be actuated to register irregularities within the ranges determined by their respective limit detectors. In this matter, the cumulative total of surface irregularities on the road within predetermined ranges of magnitude will be registered on the counters and recorded by the camera 18. If desired, cutout switches (not shown) may be provided in the circuits between the limit detectors 70 and the counters 28 to stop the counters each time the camera is actuated. In this manner, the counters will be stopped while the camera shutter is open so as to eliminate any possibility of blurring in the photographic record produced.

The means by which the present invention operates to provide readings of road grade and side slope may be understood by reference to FIGS. 3 through 7 of the drawings. As shown, the artificial horizon device on which the indicating face 32 is mounted is generally designated by the numeral 74. This device includes within a casing 76, a gyroscope 78 of conventional design supported on transverse bearings 80 within a gimbal frame 82 in turn supported on longitudinal bearings 84. A transparent grade indicating face 86 is supported forwardly of the gyroscope 78 from an arm 88 extending from the gimbal frame 82 and a scale arm 90 having a pair of legs 91 connected to an indicating line 92 extending across the front of the face 86 is pivotally mounted to the rear of the frame by pins 93. In conventional fashion, the legs 91 of the scale arm are formed having slots 94 through which extend L-shaped pins 95 carried by the gyroscope to register changes in inclination which occur between the frame 82 or housing 76 and the gyroscope 78 about the transverse axis 80 thereof. Since the housing 76 is mounted with its longitudinal axis parallel to the longitudinal axis of the vehicle 10, such changes of inclination will correspond directly to change in grade occurred by the vehicle in traveling over a road. Supported from one leg 91 of the scale arm 90 forwardly to the pin 95 by way of a bracket or strut 96 is a photo sensitive cell 97 of conventional design and adapted to deliver an electric signal upon exposure to light. The cell 97 as shown in FIGS. 5 and 6, is positioned behind the grade indicating face 86, which in turn is provided on one surface thereof with a line of alternately opaque and transparent portions 98 and 100 respectively. The opaque and transparent portions 98 and 100 are graduated to any desirable units of grade change so that for each unit change in grade encountered by the vehicle and thus sensed by the artificial horizon device, the cell 97 passes a transparent portion 100, is exposed to light, and thus delivers an electric signal.

Also positioned on the scale arm 90 forwardly of the pins 95 is an upstanding strut 102 in frictional engagement with the actuating lever 104 of a micro-switch 106 mounted on the casing 76. With this arrangement as the line 92 and strut 102 move downwardly with respect to the grade indicating face 86 such as when the vehicle is on a positive or upwardly inclined grade, the lever 104 is carried with it to open the micro-switch 106. Conversely, if the line 92 is moved upwardly with respect to the face 86, such as when the vehicle encounters a negative or downwardly inclined grade, the arm 104 is also carried upwardly to close the micro-switch 106.

The manner in which the artificial horizon device 74 operates to register changes in grade encountered by the vehicle in traveling a road may now be understood by referring again to FIG. 4 of the drawings. As shown therein, the microswitch 106 is arranged to open or close a circuit 108 including the source of electrical energy 48 and a solenoid 110. Also in series with the source 48 by way of a line 112 is a switch 114 adapted to be closed in response to a signal generated by the photoelectric cell 96. A line 116 extends from the switch 114 to the blade 118 of a single pole, double throw switch having contact terminals 120 and 122 to which are connected lines 124 and 126 leading to solenoids 128a and 128b respectively. The solenoid 128a is arranged to actuate counter 30a while the solenoid 128b is arranged to actuate counter 30b. Thus, when vehicle encounters an upwardly inclined or positive grade, the forward portion arm 90 and line 92 move downwardly carrying therewith the micro-switch actuating lever 104 to open the switch 106, thereby deenergizing the solenoid 110 to leave the blade 118 in contact with the terminal 120 and complete a circuit to the solenoid 128a, in which circuit the photo-electric cell actuated switch 114 is located. Thus, any positive change in grade will operate to close the switch 114 each time a transparent portion 100 is passed by the cell 97 to provide a cumulative total of unit grade changes registered on the counter 30a. On the other hand, when the indicating line 92 on the scale arm 90 moves upwardly upon the occurrence of a negative or downwardly inclined grade, the switch 106 is closed by frictional engagement of the strut 102 with the actuating lever 104 to energize the solenoid 110 throwing the switch blade 118 into contact with the terminal 122, and thereby completing a circuit to the solenoid 128b. Correspondingly, the cell 97 will operate to close the switch 114 each time a transparent portion 100 on the grade indicating face 86 is passed by the cell to register a cumulative total of negative grade changes on the counter 30b.

The housing 76 carries at its forward end a transparent closure 77 having on opposite sides thereof a pair of indicating arrows or points 130 positioned forwardly of graduated scales 132 on the forward surface of the grade indicating face 86. Because the face 86 is carried by the gimbal frame 82 it remains horizontal under the influence of the gyroscope at all times, whereas the housing 76 mounted on the panel 14 tilts about its longitudinal axis when the vehicle encounters side slopes on the road over which it travels. Accordingly, the indicating points 130 will be moved angularly with respect to the graduated scales 132 to provide an indication of the side slope thus incurred. Further, since the indicating point 130 and the graduated scale 131 are exposed to the camera, this information will be photographed.

The third counter 34, as aforementioned, operates to register changes in direction incurred by the vehicle as it travels over a road and correspondingly, to register changes in the line of the road. To sense such road line changes, a gyrocompass 132 is provided on which the indicating face 36 is mounted and displayed on the rearward face of the panel 14 as mentioned above, the details of the gyrocompass being illustrated in FIGS. 8 and 9 of the drawings. The gyrocompass is of conventional design having a housing 133, the indicating face thereof having a stationary indicating line 134 behind which is disposed a rotatable graduated scale 135. In accordance with this invention, the gyrocompass is modified to provide a shaft extension 136 extending upwardly and driven in synchronism with the shaft on which the graduated scale 135 is supported. On the shaft extension 136 is provided an umbrella-like cap 138 having a depending skirt 140, which in turn, is provided with a plurality of alternating opaque and transparent sections 142 and 144 respectively. Within the skirt 140 is positioned a light 146, mounted on a bracket 148 suitably secured to the gyrocompass housing 133. Also mounted on the housing 133 is a box 150 within which is mounted a photoelectric cell 152, the box having an aperture 154 in line with the light 146 and photocell 152. The width of the respective opaque and transparent sections 142 and 144 on the skirt 140 are calibrated to conventional angular units such as degrees or radians such that for each unit of angular change in direction incurred by the vehicle, the gyrocompass housing, and thus the light 146 and photocell 152 are moved past a transparent section 144 of the relatively stationary skirt 140 and the cell 152 exposed to the light 146 to produce an electric signal in a manner well known to one skilled in this art. The signal is transmitted by way of a cable 156 to the solenoid (not shown) by which the counter 34 is actuated. Thus, it will be seen that each unit change in line incurred by the vehicle traveling on the road to be tested will be registered on the counter 34 and the camera 18. Also, the precise direction in which the vehicle is traveling at the time of recording will, of course, appear on the photographic record since the face 36 with its line 134 and scale 135 are within the optic field of the camera.

In use, the vehicle 10 having the aforementioned apparatus mounted thereon will be driven to the beginning of a road under observation and for which information pertaining to the appearance, geometry and surface characteristics is desired. The counters 28, 30, 34 and 38 are all adjusted to zero to ready the apparatus for the recording operation. Then, after having operatively connected the apparatus with the appropriate power sources, the vehicle is merely driven along the road at suflciently high speeds so that the accelerometer 62 is actuated by surface irregularities. Extremely high speeds, however, should be avoided to assure contact of the wheel 20 with the road surface at all times. Under the control of the cam wheel 56, the camera shutter will be opened each one $1/100$ of a mile to photographically record the distance from the beginning of the road at which the record was made through the counter or odometer 38, the speed at which the vehicle was moving as registered by the speedometer needle 42, the direction in which the vehicle was traveling as indicated by the gyrocompass dial 36, the cumulative total of line changes incurred by the vehicle up to the point of travel at which the record was made, the cumulative total of surface irregularities within the ranges of magnitude to which the limit detector 70 corresponding to each of the first set of counters 28 have been adjusted, the grade at which the vehicle was inclined at the time the record is made as well as the side slope indicated by the pointers 130 and the cumulative total of both positive and negative grade changes as indicated by the counters 30a and 30b. Also the appearance of the road will be recorded in the photographic record as aforementioned. After the road under observation has been completely traveled by the vehicle, the exposed film in the camera 18 is removed and processed to provide an accurate and current record of the appearance, geometry and surface characteristics of the road under observation. Because the grade, line and surface characteristics are recorded directly in digital units on the counters 28, 30 and 34 the photographic records will require little processing to provide the information required to make conclusions as to the status of the road, since these numbers may be merely transplanted into empirical formulas to provide an index of road efficiency. Because the counters 28, 30, 34 and 38 register cumulative totals of their respective measurements, the last photographic recording made for the road under observation will furnish a summary, in itself, of the condition of the road without further processing. Also, if a more detailed examination is necessary, a complete record is provided on each photograph which may be used for involved studies such as where it is desired to draw profile or grade curves of the road under observation as well as to plot the line thereof.

Thus, it will be seen that by this invention an extremely effective method and apparatus for recording geometric appearance and surface characteristics of a road is provided by which the aforementioned objects are completely fulfilled. The provision of a highly complete record in an extremely efficient manner as well as the unique apparatus by which these records are obtained make available to the highway planning and maintenance engineers a current inexpensive and accurate record of pre-existing road conditions from which information may be directly used without involving a substantial revision and coordination of information indicated.

Since many changes can be made in the present invention as specifically described above, it is to be distinctly understood that the foregoing description is illustrative only and not limiting, the true scope of the invention being determined by the appended claims.

I claim:

1. Apparatus adapted to be mounted in a vehicle for recording road appearance, geometry, and surface characteristics comprising: means for sensing and indicating surface irregularities, said means including a wheel adapted to engage the road surface and connected to the vehicle, a vibration-sensing device carried by said wheel, a plurality of digital counters to indicate the cumulative total of surface irregularities, each of said counters adapted to register irregularities in a range of predetermined magnitude, and means for actuating said counters individually in response to vibrations sensed by movement of said wheel over the road surface; direction indicating means including a digital counter for registering the cumulative total of unit direction changes made by the vehicle in traveling over the road; grade indicating means including a digital counter for registering the cumulative total of positive unit grade changes and a digital counter for registering the cumulative total of negative unit grade changes; a speedometer having a dial for indicating vehicle speed; an odometer for indicating distance traveled by the vehicle; a display panel visibly supporting said counters, said speedometer dial and said odometer on one face thereof; a camera mounted in the vehicle and having said panel within its optic field; and means for actuating said camera at predetermined distances along the road to record the data displayed on said panel.

2. Apparatus adapted to be mounted on a vehicle for recording road appearance, geometry and surface characteristics comprising: a camera; a panel having a face presented to the optic field of said camera; a first set of counter displayed on said panel face for registering road surface irregularities; a second set of counters displayed on said panel face for registering cumulative unit changes in road grade; a third counter displayed on said panel face for registering cumulative unit changes in vehicle direction; a fourth counter displayed on said panel face for registering distance of vehicle travel; a speedometer having an indicating dial also displayed on said panel; means for actuating each of said first set of counters in response to a predetermined range of irregularity magnitudes; artificial horizon means for detecting road grade; means for actuating one of said second set of counters in response to positive grade changes and another of said second set of counters to register negative grade changes detected by said artificial horizon means; compass means for detecting direction of vehicle travel; means for actuating said third counter in response to unit changes in vehicle direction detected by said compass means; and means for operating said camera to photograph said panel face at predetermined distances of vehicle travel.

3. The apparatus recited in claim 2 in which said means for actuating said first set of counters includes a ground-engaging wheel on the vehicle; an accelerometer carried by said wheel for sensing road surface irregularities and generating a pulse corresponding in magnitude to the magnitude of irregularity sensed; and means for transmitting said pulse including limit detectors for each of said first set of counters, said limit detectors operating to pass pulses of varying predetermined magnitude to actuate each of said first set of counters respectively.

4. The apparatus recited in claim 2 in which said means for actuating said second set of counters includes a sensing device on said artificial horizon means for producing an electric signal for each unit change in grade; an electric circuit including a source of power and said sensing device; switch means for connecting said circuit alternately with said one and said other of said second set of counters; and means for operating said switch means to connect said circuit with said one counter when said artificial horizon means detects a positive grade and to said other counter when a negative grade is detected.

5. The apparatus recited in claim 2 in which said means for actuating said third counter includes a source of electrical energy; and a sensing device for connecting said source to said third counter for each unit change in vehicle direction.

6. The apparatus recited in claim 2 in which said means for operating said camera comprises a circuit including a source of electrical energy and a solenoid for opening the shutter of said camera; switch means for completing said circuit; and cam means movable with said fourth counter to close said switch means at uniform distance intervals of vehicle travel.

7. The apparatus recited in claim 2 in which a view of the road is also presented to the optic field of said camera to record road appearance.

8. Apparatus adapted to be mounted in a vehicle for recording the line, grade and surface characteristics of a road comprising: means for sensing and indicating surface irregularities, said means including a road surface engaging wheel connected to the vehicle, a vibration-sensing device carried by said wheel, a plurality of digital counters to indicate the cumulative total of surface irregularities, each of said counters adapted to register irregularities in a range of predetermined magnitude, and means for actuating the said counters individually in response to vibrations sensed by movement of said wheel over the road surface; direction-indicating means including a digital counter for registering the cumulative total of unit direction changes made by the vehicle in traveling over the road; grade-indicating means including a digital counter for registering the cumulative total of positive unit grade changes and a digital counter for registering the cumulative total of negative unit grade changes; a speedometer for registering vehicle speed; an odometer for registering the cumulative total of unit distance traveled by the vehicle; recording means for simultaneously recording the information registered on said counters, said speedometer and said odometer; and means for actuating said recording means at predetermined distances along the road.

9. The apparatus recited in claim 8, wherein the said recording means is a camera having a view of the road within its optic field and including further, means for supporting said counters, said speedometer and said odometer also within the optic field of said camera.

References Cited in the file of this patent

UNITED STATES PATENTS

| | | |
|---|---|---|
| 2,149,440 | Jackson | Mar. 7, 1939 |
| 2,232,537 | Kollsman | Feb. 18, 1941 |
| 2,236,543 | McFaddan | Apr. 1, 1941 |
| 2,370,000 | Best | Feb. 20, 1945 |
| 2,460,726 | Arndt | Feb. 1, 1949 |
| 2,471,009 | Reason | May 24, 1949 |
| 2,516,189 | Dinsmore | July 25, 1950 |
| 2,607,996 | Moyer | Aug. 26, 1952 |
| 2,669,786 | Lynch | Feb. 23, 1954 |
| 2,941,459 | Fairbanks et al. | June 21, 1960 |